B. D. CHAMBERLIN.
GLASS BLOWING MACHINE.
APPLICATION FILED JULY 24, 1908. RENEWED OCT. 29, 1910.
1,137,304.
Patented Apr. 27, 1915.
5 SHEETS—SHEET 5.
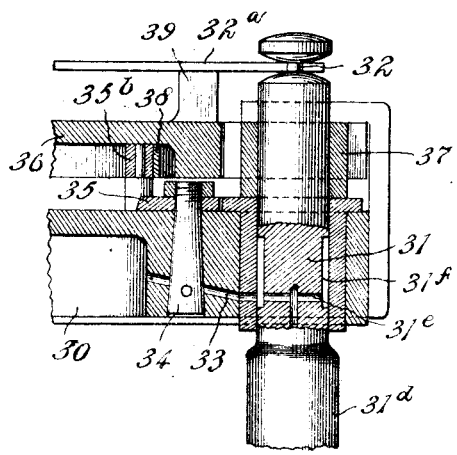
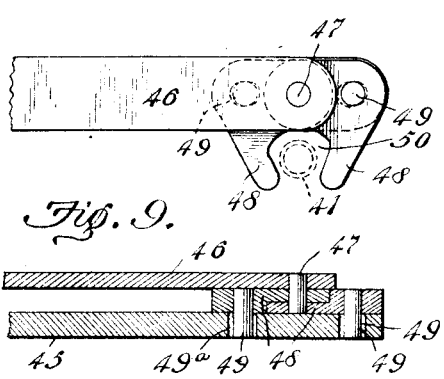
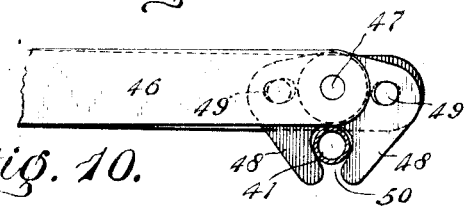
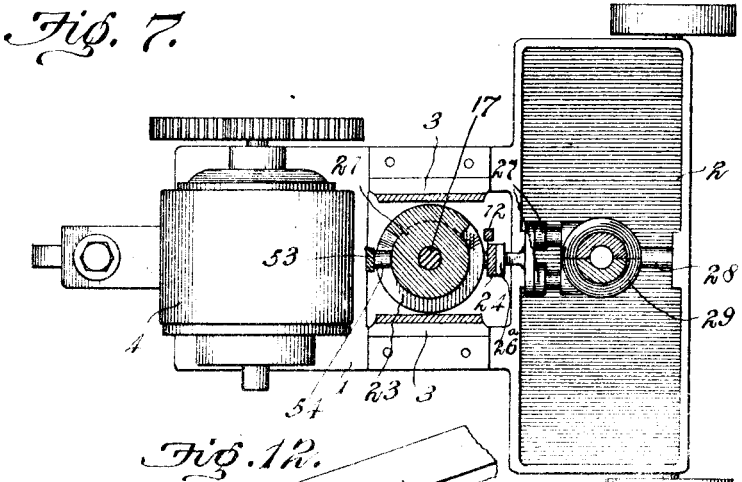

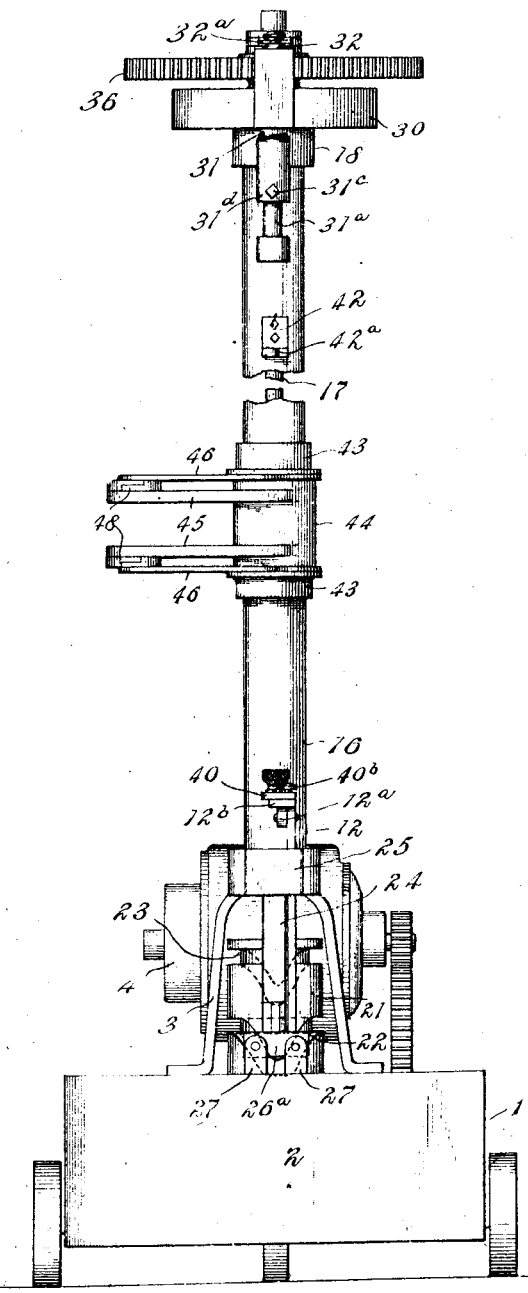

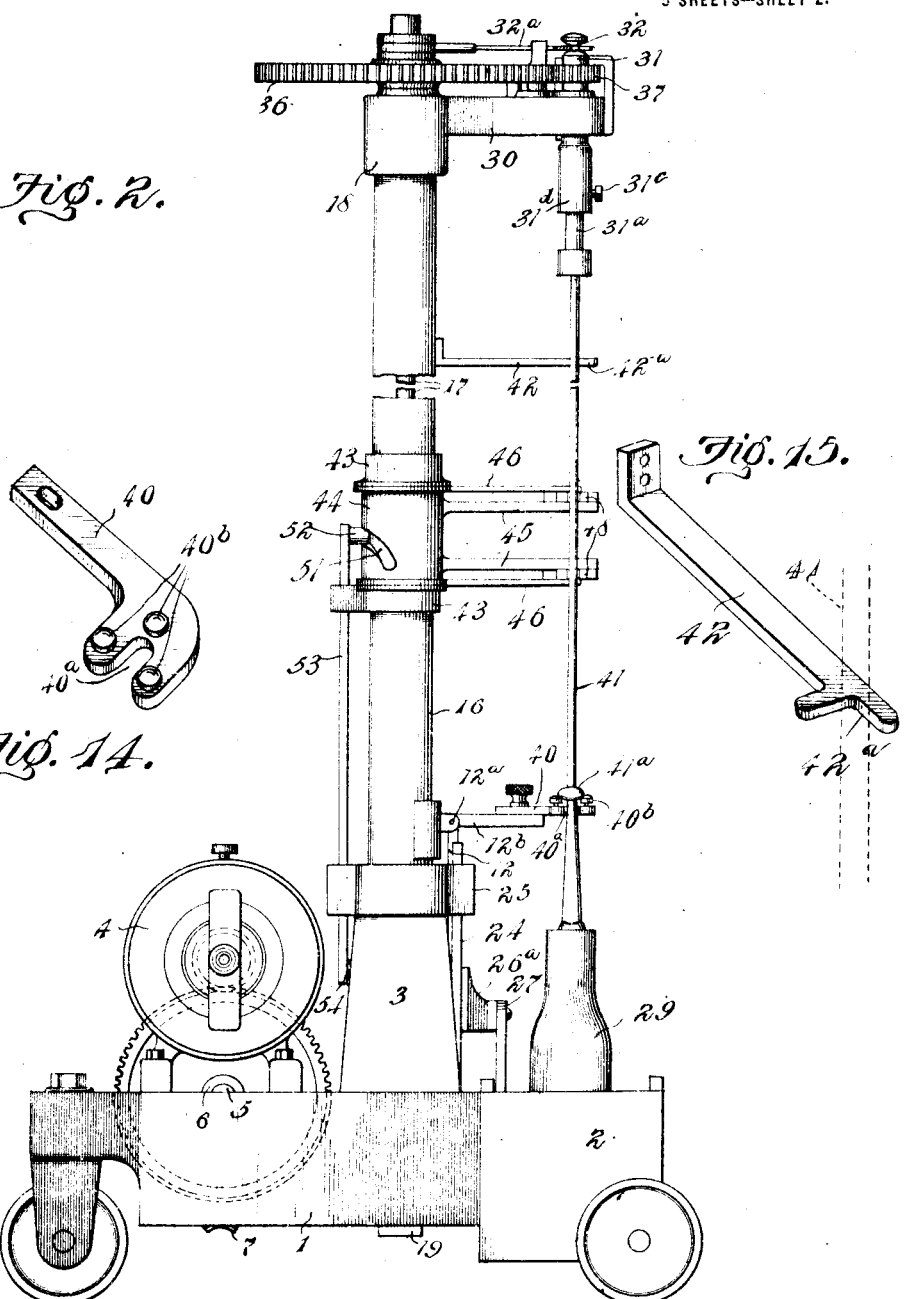

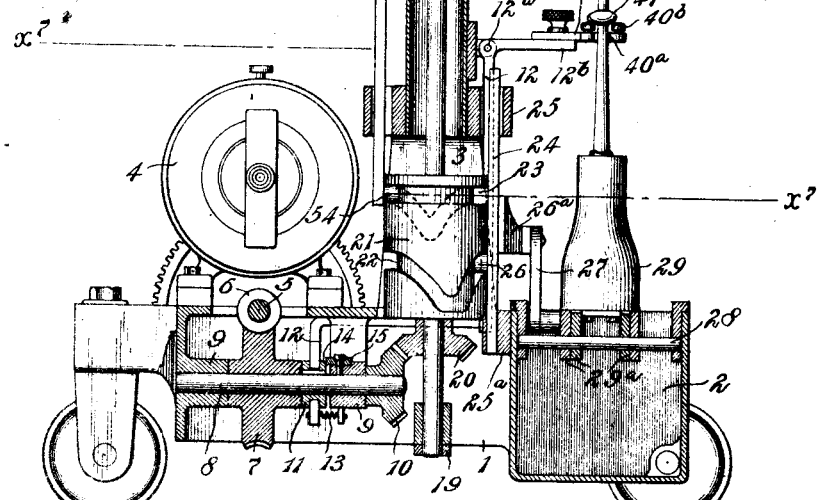

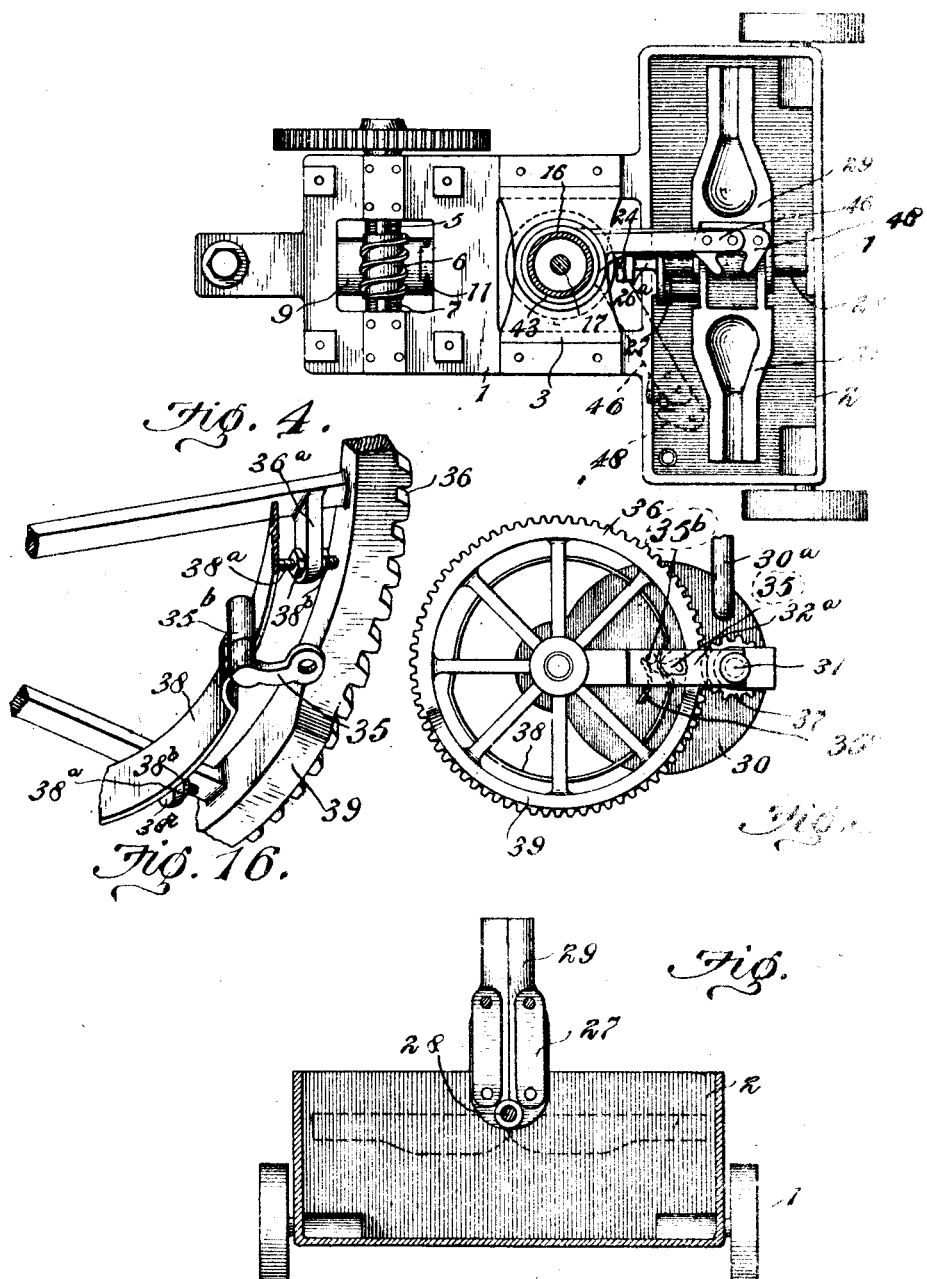

UNITED STATES PATENT OFFICE.

BENJAMIN D. CHAMBERLIN, OF WASHINGTON, DISTRICT OF COLUMBIA, ASSIGNOR TO EMPIRE MACHINE COMPANY, OF PORTLAND, MAINE, A CORPORATION OF MAINE.

GLASS-BLOWING MACHINE.

1,137,304.  Specification of Letters Patent.  Patented Apr. 27, 1915.

Application filed July 24, 1908, Serial No. 445,252. Renewed October 29, 1910. Serial No. 589,786.

*To all whom it may concern:*

Be it known that I, BENJAMIN D. CHAMBERLIN, a citizen of the United States of America, and a resident of Washington, District of Columbia, have invented certain new and useful Improvements in Glass-Blowing Machines, of which the following is a specification.

My invention relates to a machine for performing certain operations attendant upon the production of blown glass articles. In the usual processes employed for the production of such articles a suitable quantity of glass having been gathered upon the end of a blow-pipe, it receives a preliminary shaping by marvering or swinging, and is then inserted in a separable mold, which is closed thereon, and is blown while located within the mold by admitting air to the interior thereof rotation being simultaneously imparted to the blow-pipe or mold in respect to each other for the purpose of eliminating the impression which would otherwise be made by the joint of the mold. For these purposes my invention contemplates a machine embodying a vertical rotary shaft from which motion is communicated to several parts adapted to perform the operations of opening and closing the mold, of rotating the blow-pipe and of controlling the admission of air thereto. In addition, the same shaft performs the further function of imparting motion to mechanism which after the article has been blown upon the pipe removes such pipe from the machine, thus dispensing with the presence, at the machine, of an operator for that purpose and furthermore causes the necessary manipulation in the air head to permit this. It is not essential however that the vertical shaft perform these last named operations, as the same can be performed by any appropriate mechanism properly synchronized in respect to the driving power of the other parts of the machine. This removal of the blown article by machine is an important feature of my invention in that it dispenses with one operator around the blowing point, with the confusion tending thereon and it will be understood that as far as such feature is concerned it may be aplied to a variety of machines differing in construction from that disclosed herein.

My invention further consists in the construction, combination and arrangement of the several parts of which it is composed as will be hereinafter more fully described and claimed.

Referring now to the accompanying drawings, in which corresponding parts are designated by corresponding marks of reference:—Figure 1 is a front elevation of a machine constructed in accordance with this invention, the mold being in the cooling bath. Fig. 2 is a side elevation thereof, the mold being closed and the blow-pipe being in the machine and the parts being in position preparatory to blowing. Fig. 3 is a sectional elevation of the parts in position shown in Fig. 2. Fig. 4 is a plan view, partly in section of the base of the machine and the parts mounted adjacent thereto, with the motor removed, the mold being open. Fig. 5 is a plan elevation of the blowing head and air valve mechanism. Fig. 6 is a rear elevation of the mold and the mold closing links. Fig. 7 is a horizontal section on lines $x^7$—$x^7$ of Fig. 3. Fig. 8 is a detail sectional view of the air head and valve mechanism. Fig. 9 is a plan of the removing mechanism, the jaws being shown in their open position. Fig. 10 is a similar view showing the jaws closed upon the blow-pipe. Fig. 11 is a section through the parts shown in Figs. 9 and 10. Fig. 12 is a perspective view showing the several parts of Figs. 9—10 and 11 as separated for the purpose of illustration. Fig. 13 is a detail view of the clutch controlling mechanism. Fig. 14 is a prespective of the blow-pipe rest. Fig. 15 is a perspective of the upper blow-pipe guide. Fig. 16 is a perspective of the parts of the head of the machine.

The base 1 is in the form of a truck upon which the various parts are mounted and whereby the machine may be readily removed from place to place, the said base having a cooling tank 2 at its forward end and provided in the rear thereof with various bearings for the driving mechanisms as will be hereinafter described, a bifurcated standard 3 arising from the top of the base immediately in the rear of the tank. In the rear of the standard the base carries a suitable motor 4, by preference electric, geared to the shaft 5 mounted in the base. A worm 6 upon the shaft 5 gears with the worm-wheel 7 loosely mounted on the longitudinal shaft 8 carried in bearings 9—9 in the base, the forward end of the said shaft having a beveled gear 10, keyed thereto. A clutch collar 11 is splined on the shaft 8 and is provided with engaging teeth to engage corresponding teeth upon the wheel 7 when moved rearwardly on the shaft, its movement in this direction being controlled by lever 12 hereinafter referred to, the clutch engaging end of the lever being normally drawn toward the front of the machine by a spring 13. The collar 11 has upon its forward face a seat 14 on one of its sides, in which a hardened steel plate 15 carried on the forward bearing 9 of the base normally projects. When the collar is rotated, however, from its normal position, such plate bears upon the flat portion of the front face of the collar and thereby holds the collar in clutch engagement with the wheel 7. Rigidly attached to the upper end of the bifurcated standard 3 and rising therefrom is the hollow cylindrical standard 16 from which various instrumentalities hereinafter to be described are supported.

The main vertical drive shaft 17 is partly located within the hollow standard, its upper end projecting from the head 18 thereof, which forms the upper bearing for the said shaft, while its lower end extends downwardly within the bifurcation of the bifurcated standard and is carried by a bearing 19 at the bottom of the base, the shaft having rigidly secured thereto a beveled gear 20 engaging with the beveled gear 10 upon the horizontal shaft 8, whereby it will be intermittently driven according to the position of the clutch.

The shaft 17 carries thereon within the bifurcation of the bifurcated standard a cylinder 21 having on the periphery thereof two cam grooves 22—23. A rod 24 guided in a bearing 25 at the top of the bifurcated standard and in a bearing 25$^a$ in the base, is located immediately in front of the cylinder 21 and has mounted thereon a roller 26 engaging the lower cam groove 22, the rod having upon its forward face a bracket 26$^a$, to which is pivoted the upper ends of each of a pair of links 27.

Within the tank 2 is secured the longitudinal shaft 28 on which is pivoted the parts of a two part mold 29, by means of ears 29$^a$ depending from the bottom of the mold parts. The lower ends of the links 27 are each secured to one of the parts of the mold to one side of the pivotal point thereof upon the shaft, so that a lowering of the said links results in the lowering of the mold parts around the shaft 28, while a lifting of the links results in a raising of the mold parts around the said shaft. The cam groove 22 is so shaped and proportioned that at one time (see Fig. 1) the mold parts will be in their horizontal position, in which they will be immersed in the cooling liquid in the tank 2 and will on the rotation of the cylinder 21 be turned upon the horizontal shaft to close (Figs. 2 and 3) remaining in this closed position for a proper time and being then subsequently opened, the latter corresponding to the position in which the clutch controlling mechanism has permitted the clutch to open and the main shaft 17 driven thereby to be arrested.

Formed upon the head 18 of the hollow standard 16 is the forwardly projecting hollow enlargement 30, which is apertured vertically above the center of the molds when closed to serve as a guide for the stem 31 of the air head, the upper end of which is annularly grooved at 32 to receive the bifurcated end of a spring 32$^a$ by which it is normally depressed. The lower part of the head is telescopic, the inner section 31$^a$ being provided with a seat 31$^b$ adapted to receive the upper end of a blow-pipe, the two parts of the head being secured in the desired position dependent upon the length of the blow-pipe employed by means of a set screw 31$^c$. The lower section 31$^a$ of the head and the lower part of the upper section 31$^d$ thereof are hollow, the last named section being provided with a transverse channel 31$^e$ by which air is admitted through the interior of the head to the blow-pipe upon which it is seated, the said upper part of the head being annularly grooved at 31$^f$ within the aperture of the extension. The interior of the extension 30 is in communication with a source of air under pressure, by means of the pipe 30$^a$ and such interior is in communication with the air head guiding aperture of the extension by means of the air passage 33, in which is interposed the air valve 34 all of which is clearly shown in Fig. 8. This valve is mounted within the extension and has upon its upper end a tappet lever 35 normally thrown into position to close the valve by means of a leaf spring 35$^a$, the tappet terminating in an outwardly extending roller 35$^b$.

Upon the upper end of the shaft 17 is mounted the gear wheel 36, which gears with the pinion 37 upon the upper end of the upper part of the telescopic air head. The gear wheel also carries upon its lower face and inside of the rim thereof a cam track 38 upon which the roller of the tappet lever 35 is adapted to bear. the said cam track being so shaped as to actuate the air valve through said lever and to thereby admit air to the blow head at such times and in such quantities as the article being blown may demand. To permit the adjustment of the cam track for different articles it by preference consists of a flexible band having projecting from the outer face thereof a series of threaded studs 38$^a$ taking in lugs 36$^a$ upon the bottom of the spokes of wheel 36 and being adjustable in respect thereto by means of lock nuts 38$^b$. The upper face of the rim of the wheel 36 is provided with a raised cam flange 39, which after the termination of the blowing period moves under the spring 32ª and which in the normal position of rest of the machine (Fig. 8) lies beneath such spring, thus lifting the air head and holding it lifted. At other times the cam is moved from underneath the spring and the air head is caused to descend by the pressure thereof firmly seating it upon the blow-pipe which may be in the machine, the raised position of the blow-head corresponding approximately to the period the molds are opened.

The clutch lever 12 extends upwardly in front of the standard of the machine and has pivoted thereto at 12ª a forwardly extending horizontal end 12ᵇ on which is adjustably mounted a plate 40 having an open slot 40ª in the side thereof, in which the blow-pipe may be inserted, the plate having adjacent to the slot anti-friction rollers 40ᵇ, upon which a collar 41ª provided upon each of the blow-pipes 41, rests, the plate therefore serving as the guide for the lower end of the blow-pipe.

The hollow standard 16 has forwardly projecting from its face near the upper end thereof a stop arm 42 provided with a notch 42ª in its forward end against which the blow-pipe may be pressed by the attendant, thus alining it with the air head which at the time of the insertion of the blow-pipe is lifted.

Between the arm 42 and the plate 40 and projecting from the hollow standard 16 is mounted certain apparatus for removing the blow-pipe with the blown article thereon, such mechanism consisting essentially of parts adapted at proper periods to automatically close upon the blow-pipe and remove the same horizontally from its position above the mold, and at other times being free from the blow-pipe to permit its rotation by the air head in the manner before described. The removing apparatus as shown is as follows: Collars 43 are mounted upon the exterior of the hollow standard 16 and between them is contained a sleeve 44 also mounted upon the said standard and capable of rotation in respect thereto, the said sleeve having projecting therefrom spokes 45. Adjacent to each of the spokes and also sleeved upon the hollow shaft are the arms 46. As the spokes and arms with the parts carried thereby are merely duplicated to insure a firmer grip upon the pipe, only one set will be described in detail.

To the end of the bar 46 is pivoted by the pin 47, a pair of jaws 48, substantially the shape as shown in Figs. 9 to 12, the jaws being oppositely disposed in respect to the pivotal point, and each having on opposite sides of such point a pin 49 projecting from one side thereof and contained in an aperture 49ª in the corresponding spoke 45, such spoke and arm being normally located to one side of the line joining the air head and the mold and therefore to one side of the blow-pipe when in place, the blow-pipe being contained within the recess 50 of the jaws but out of contact therewith when the parts are in their normal position (Fig. 9). A cam groove 51 is formed in the sleeve 44 and receives a roller 52 mounted on the upper end of a link 53, the lower end of which is provided with a roller 54 engaging the cam groove 23 in the cylinder 21 fast upon the vertical driving shaft 17, the position and relation of the several cams being such that before the complete closing of the molds the spokes 45 and arms 46 will be in their normal position and that this position will be maintained during the whole period the molds are closed and until after the molds are opened, when the downward motion of the link 53 will rotate the sleeve 44 upon the hollow standard and thereby swing the spokes and arm toward the dotted position shown in dotted lines in Fig. 4. In this movement the spokes 45 will first swing and will by means of the pins 49 swing the jaws upon their pivots 47 thus closing the same upon the pipe contained within the recess of the jaws, this being due to the inertia of the arms 46 upon which the jaws are carried. As soon as the jaws have engaged the pipe the spokes, will by their connection to the said arms through the pins 49, jaws 48 and pivots 47, drag the arms with them and at the same time will remove the blow-pipe from over the mold, the mold having been opened and the air head lifted at this time. The parts having swung to the position shown in dotted lines in Fig. 4 the direction of rotation of the sleeve 44 will be reversed and the spoke 45 will then start to swing reversely, this by reason of the inertia or by the friction of the arm 46 opening the jaws and releasing the blow-pipe which may then be received by an attendant or a supplemental machine designed to perform various subsequent operations, and will then, by the continued reverse movement of the said spokes restore the arms to their normal position at which time a fresh blow-pipe with the pre-gathered glass thereon may be inserted.

It will be seen that the operation of the machine is entirely automatic save the insertion of the blow-pipe within the machine and perhaps the starting of the machine. This latter can either be accomplished by the operator, after inserting the blow-pipe, shoving the pipe down upon the plate 40 and thus rocking the clutch lever 12 to engage the clutch, or it may be accomplished by the weight of the blow-pipe itself. In either case, the clutch cannot open after the initial movement of the collar until the collar has made a complete revolution and brought the recess 14 thereof opposite the plate 15. If the throwing in of the clutch is dependent upon the weight of the blow-pipe the clutch will still perform this operation in the manner before described, for the reason that during the operation of the collar toward its normal position after having been started, the blow-pipe will have been removed from the machine by means of the removing apparatus before described, so that when the collar will have completed its revolution there will be no blow-pipe upon the plate of the clutch lever tending to hold the clutch closed.

Having thus described my invention what I claim and desire to secure by Letters Patent is:—

1. In a glass-blowing machine, the combination with a mold opening mechanism and an air-supply mechanism, of a motor for driving the same, a clutch interposed between the said motor and the mold and air mechanisms, and a clutch-actuating lever forming a vertically movable blow-pipe support.

2. In a blow-pipe removing mechanism for a glass blowing machine, the combination of a horizontally swinging arm, jaws pivoted to the said arm and adapted to encircle the blow-pipe and driving means for the arm to which the said jaws are connected to the sides of their pivotal point, said driving means being synchronized in respect to the blowing machine.

3. The combination with a mold closing and opening mechanism, of a vertically movable blow head, an arm movable in a horizontal plane, pipe removing jaws pivoted to the said arm, and a driver for the arm to which the said jaws are secured to the sides of their pivotal points and mechanism for actuating the several mechanisms in a predetermined order.

4. The combination with a mold closing and opening mechanism, of a vertically movable blow head, an arm movable in a horizontal plane, pipe removing jaws pivoted to the said arm, a driver to which the said jaws are secured to the sides of their pivotal points and a shaft for actuating the several mechanisms in a predetermined order, and a clutch for the said shaft closed by the weight of the blow-pipe.

5. In a glass-blowing machine, the combination with a vertical shaft, of a separable mold, a cam track on the said shaft for opening and closing the said mold, a vertically movable blowing head actuated by the said shaft, a horizontally swinging arm, jaws pivoted to the said arm, a spoked collar moving concentrically with the said arm, the jaws being attached to the spoke of the said collar, and means for imparting a reciprocating rotary motion to the said collar from the said shaft.

6. In a glass blowing machine the combination with a non-traveling mold of a non-traveling air head, and a non-traveling blow-pipe support, of an intermittently movable blow-pipe carrier having a position of rest over the mold and normally free from the blow-pipe and means for opening the mold and moving the carrier with the blow-pipe thereon to remove the blown article away from the mold.

BENJAMIN D. CHAMBERLIN.

Witnesses:
   Golden Brown,
   V. M. Dorsey.